(12) United States Patent
Bell et al.

(10) Patent No.: US 9,549,044 B1
(45) Date of Patent: Jan. 17, 2017

(54) DATA PROCESSING

(71) Applicant: International Business Machines Corporation, Armonk, NY (US)

(72) Inventors: Mark Bell, Gournay en Bray (FR); Rick A. Hamilton, II, Charlottesville, VA (US); Ninad D. Sathaye, Pune (IN); Rajesh Sathiyanarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/948,614

(22) Filed: Nov. 23, 2015

(51) Int. Cl.
*G06F 15/16* (2006.01)
*H04L 29/08* (2006.01)

(52) U.S. Cl.
CPC ........... *H04L 67/327* (2013.01); *H04L 67/306* (2013.01); *H04L 67/34* (2013.01)

(58) Field of Classification Search
CPC .............................. H04L 65/60; H04L 65/4084
USPC ................................................. 709/223, 224
See application file for complete search history.

(56) References Cited

U.S. PATENT DOCUMENTS

| 7,756,950 | B2 | 7/2010 | Wu et al. | |
|---|---|---|---|---|
| 2008/0306909 | A1 | 12/2008 | Bernard et al. | |
| 2012/0016678 | A1 | 1/2012 | Gruber et al. | |
| 2012/0316955 | A1 | 12/2012 | Panguluri et al. | |
| 2014/0259038 | A1* | 9/2014 | Belyaev | H04N 21/458 725/14 |
| 2015/0112962 | A1 | 4/2015 | Simhon et al. | |

OTHER PUBLICATIONS

Mark J, Cisco Records Explosion in Mobile Broadband Data Traffic During 2010, Feb. 3, 2011, Retrieved on Oct. 27, 2015,2 pages.
Prof Ian Bitterlin, EMEA Forum 2013, TGG EMEA Future Directions: Getting Involved, www.thegreengrid.org, 14 pages.
Lee et al., A prediction and auto-execution system of smartphone application services based on user context-awareness, Journal of Systems Architecture, Journal of Systems Architecture 60 (2014) pp. 702-710.

* cited by examiner

*Primary Examiner* — Adnan Mirza
(74) *Attorney, Agent, or Firm* — Schmeiser, Olsen & Watts, LLP; Isaac Gooshaw

(57) ABSTRACT

A method and associated system. A user interest rating for a downloadable item stored outside a user device is computed, which includes: maintaining a user profile of a user's preference for types of items that include the downloadable item, identifying one or more characteristics of the downloadable item, and predicting a likely level of user interest for the downloadable item based on the identified characteristics of the downloadable item and the user profile. A data impact rating for the downloadable item is computed, which includes identifying parameters. A download decision, of whether to download the downloadable item, is computed in dependence on the user interest rating for the downloadable item and the data impact rating for the downloadable item.

20 Claims, 7 Drawing Sheets

Data
D1: Personal Preferences
D2: Social Popularity
D3: Time Influence
D4: Data Consumption
D5: Device Memory

File Types
F1: Applications (executable)
F2: Audio
F3: Video
F4: Images
F5: Documents (PDF, DOC)

Representative categories
C1: Article    C6: Photo
C2: Story      C7: Utility app
C3: Song       C8: News
C4: Movie clip C9: Game
C5: Recipe Perceived Interest = f(D1, D2, D3, D4, D5)

Example 1: Likability Score for a Video

| Key | Val (0-10) | Remarks |
|---|---|---|
| 'song', <name> | 9 | Hit song from a new movie |
| 'news', <name> | 7 | One day old news |
| 'news', <name> | 2 | 5 day old news |
| 'recipe', <name> | 8 | Pasta recipe, likes Italian food |

Example 2: Likability Score for an App

| Key | Val (0-10) | Remarks |
|---|---|---|
| 'utility', <name> | 9 | Taxi app. User is frequent traveller |
| 'game', <name> | 8 | Kids painting game. Family preference |
| 'game', <name> | 3 | New buggy version of favourite game |
| 'utility', <name> | 2 | Stock ticker. User pref says avoid finance apps |

FIGURE 2

DATA PROCESSING

TECHNICAL FIELD

The present invention relates to a data processing apparatus and method for managing the memory of a user device.

BACKGROUND

Individuals rely increasingly on smartphones and similar devices for communications, entertainment and productivity. There is continued market pressure to constrain the physical dimensions and cost of these devices, typically leading to constraints on storage capacity. There is a general trend towards cloud based storage. Media and applications are subject to rapid evolution. What a user may want or need today, may be of less interest tomorrow. New materials are created daily which may be of interest to a user.

SUMMARY

The present invention provides a method and associated computer system and computer program product. One or more processors of the computer system compute a user interest rating for a downloadable item stored outside a user device of a user, wherein computing the user interest rating for the downloadable item comprises: maintaining a user profile of the user, said user profile being indicative of a preference of the user for first types of items that include the downloadable item; identifying one or more characteristics of the downloadable item; and predicting a likely level of user interest of the user for the downloadable item based on the one or more identified characteristics of the downloadable item and the user profile. The one or more processors compute a data impact rating for the downloadable item, wherein computing the data impact rating for the downloadable item comprises identifying one or more parameters. The one or more processors make a download decision, as to whether to download the downloadable item, in dependence on the computed user interest rating for the downloadable item and the computed data impact rating for the downloadable item.

BRIEF DESCRIPTION OF THE DRAWINGS

FIG. 2 schematically illustrates a perceived interest calculation and some examples of downloadable items and characteristics of the downloadable items, in accordance with embodiments of the present invention.

DETAILED DESCRIPTION

Figure 1:
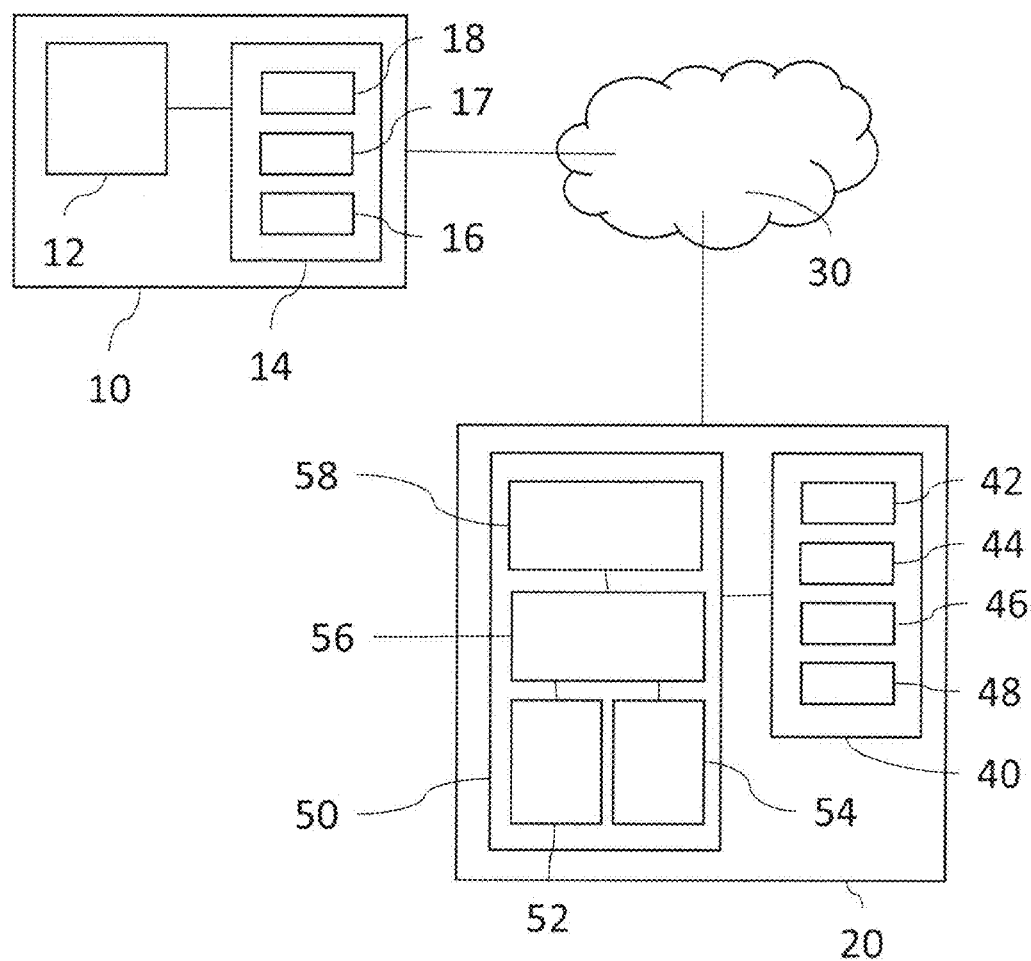
FIG. 1 schematically illustrates a user device and a server communicating via the Internet, in accordance with embodiments of the present invention.

FIG. 1 schematically illustrates a user device and a server communicating via the Internet, in accordance with embodiments of the present invention. In FIG. 1, a data processing system includes a server 10 and a user device 20 connected via the Internet 30. The server 10 is shown to include a controller 12 and a memory 14. The memory 14 in one embodiment holds 3 downloadable items 16, 17, and 18. These downloadable items may be files, and may be applications (executable files), audio files (e.g. MP3 or WAV), video files (e.g. MPEG), image files (e.g. JPEG), documents (e.g. PDF or DOC), etc. The user device 20 comprises a memory 40, storing stored items 42, 44 and 46 and a preference profile 48. The user device 20 may also include a controller 50 which in turn includes a user interest calculator 52 and a data impact calculator 54. The user device 20 may receive downloadable items such as new apps, forwarded emails or other messages, from a variety of sources such as social media. For example, an app store may regularly have new apps available for download, the user device 20 may receive an email or text message with downloadable attachments, or the user device 20 may be running social media apps for social media networks such as Facebook®, LinkedIn® or Twitter® (Facebook, LinkedIn and Twitter are registered trademarks of Facebook, Inc., LinkedIn Corporation and Twitter, Inc. respectively in jurisdictions worldwide). Each of the downloadable items may include downloadable content such as images, videos, audio or documents. For each of the preceding downloadable items, media files are stored at a server, such as the server 10, and are downloaded either to the mobile user device 20, or to a cloud storage area associated with the mobile user device 20, in order to be usable.

Given the limited storage on portable electronic devices such as mobile phones, tablets and the like, and given the limited bandwidth available to communicate content via the Internet (it will be appreciated that mobile phone carriers typically set data usage limits for users), it is desirable to make appropriate use of such bandwidth and storage capacity, while seeking to ensure that the user of the user device 20 has access to the files the user may require.

The user interest calculator 52 and the data impact calculator 54 are intended to help achieve this bandwidth and storage capacity. In particular, the user interest calculator 52 computes a likely user interest for downloadable or stored items, based on one or more of a number of techniques. In one example, a candidate downloadable item, which may be a file, has associated tags or metadata which describe properties and/or subject matter of the candidate downloadable item. A user's historical preference for the type of media associated with the tags or metadata is used to calculate a user interest for the file. For example, the degree to which a user downloads, accesses or shares/forwards items having a particular tag associated with the items can be stored as a degree of preference for that tag. Then, when that tag is identified in a new downloadable item, a level of user interest in the new item can be inferred based on the tags. It will also be appreciated that the user could explicitly populate the user's own user profile with a preference for particular tags. In the absence of any metadata (or in addition to metadata), various other factors may be taken into account (for example social media comments from people who have already viewed that media, the user's preference for links or files previously received by the same sender, and/or a preference correlation between the user and other users who have downloaded that particular media file). The user interest calculator 52 may also consider the effect of time on the user interest rating. All of the preceding factors may be tracked in the preference profile 48.

The data impact calculator 54 computes a data consumption component (or rating) which can be combined with the user interest rating to form an overall perceived interest rating, or combined rating. The data consumption component may be computed based on, for example, the proportion of the user's data limit that would be consumed in downloading the current media file. For example, if the user has 100 Mb of data allowance remaining, a single item which consumes 70 Mb may receive a low data consumption rating which biases the combined rating downwards. If, however, the single item consumes only 2 Mb, then the data impact rating may be high, which will positively impact on the overall perceived interest. The data consumption component could optionally be expressed in terms of financial cost if the user has already used up the user's quota of data transfer for the current period. The data consumption component may also (or instead) be computed on the basis of a data usage prediction for the current billing cycle based on historical trends for the user and a recent usage pattern for the user. In other words, an amount of data usage likely to be required by the user for normal usage can be effectively reserved rather than being allocated early on during a data usage period. In addition, the data consumption component may also (or instead) take into account how much of the storage space on the user device 20, or in a cloud storage area associated with the user device 20, would be consumed by downloading the item.

A combiner 56 combines the user interest rating computed by the user interest calculator 52 and the data consumption component computed by the data impact calculator 54 to form the overall perceived interest rating. An intelligent downloader 58 then either downloads the file or rejects the file based on preferences set by the user. These user set preferences may be stored in the preference file 48. Some examples of user preferences include the following:

Do not download anything with a perceived interest rating below a lower threshold irrespective of the available data limit.

Always automatically download media with a perceived interest rating greater than an upper threshold if downloading the media will not breach the data limit.

For a media item or an app with a perceived interest rating greater than the upper threshold and with the data limit already used up, the end user's choice is polled (for example by triggering the display of a message to the user giving them the option to download or not download that item).

If the perceived interest rating is between the lower and upper thresholds, the media item is automatically downloaded if the data usage for that data of the month is similar to a historical download trend.

It is therefore possible to intelligently prioritize and select which content and/or application to download to a smartphone or similar user device. As will be explained below, embodiments described herein assess available content, and take into account the user's preferences and available space on the user device 20, in order to proactively manage user-side content (which may be media content or application data) with regard to what is likely to be of interest to the user in the near future. Determinations of perceived interest can be made on the basis of content characteristics of the candidate content items for download, such as their nature (file type) or category (theme or subject matter). Social popularity, data volume and data durability can all be taken into account. The determination can be made on a user basis by identifying the user of the user device 20, and assessing for the user one or more characteristics representing the user's preferences. Such characteristics may be automatically determined by the user device 20 (or by the server 10 after which the user device 20 obtains the characteristics from the server 10) based on the user's past download history, access to local files, and sharing (forwarding) behavior, or based on a profile manually populated by the user. The perceived interest may be calculated for each candidate content item as a function of the content characteristics, user preference characteristics and available device memory. In response to selection having taken place, the size of a selected content item may optionally be adjusted in a manner described below in proportion to the user's perceived interest level in the selected content item before being downloaded to the user device 20.

FIG. 2 schematically illustrates a perceived interest calculation and some examples of downloadable items and characteristics of the downloadable items, in accordance with embodiments of the present invention. In FIG. 2, a representative computation of overall perceived interest is shown. The overall perceived interest includes the factors influencing the data consumption score described above. The perceived interest can be a function f of D1, D2, D3, D4 and D5, where D1 represents the personal preferences of the user of the user device 20, D2 represents the social popularity of the item in question, D3 represents the influence of time, D4 represents the impact of the download of the item on data consumption of the user's data allowance over a telecommunications network, and D5 represents the impact of the download on the free storage space available on the user device 20. D1, D2, D3, D4, and D5 may be combined in a number of different ways (for example multiplicatively or additively). FIG. 2 shows that the item may be one of many different file types, including executable applications (F1), audio (F2), video (F3), images (F4) and documents (F5) such as PDF or DOC files. FIG. 2 also shows that the item can be categorized, with different categories being treated differently by the perceived interest algorithm. Categories are shown to include an article (C1), a story (C2), a song (C3), a movie clip (C4), a recipe (C5), a photo (C6), a utility app (C7), a news item (C8) or a game (C9). It will be appreciated that other categories are also possible. An item belonging to the "news" category may be heavily impacted by time; that is, the item's "D3" component will serve to reduce the overall perceived interest as time passes and the news article goes out of date, whereas for a recipe, D3 may be less time dependent, and may instead for example be access dependent so that if the item is not accessed for a certain period of time, perceived interest in the item is reduced.

In Example 1 in FIG. 2, example likeability scores for video files are shown. The "Key" column of Example 1 indicates the category and name of the item (key), the "Val" column of Example 1 indicates the item's perceived interest value on a scale from 0 to 10. The "Remarks" column of Example 1 provides commentary. The first row of Example 1 is for an item having a category 'song', and has a perceived interest of 9, which is a high value. Thus, the item is likely to be downloaded automatically to the user device 20. The item is a hit song from a new movie, meaning that the item is likely to have scored high on social popularity (because the item is a hit song) and time influence (because the movie is new). The second row of Example 1 is for an item having the category 'news', and is in particular one day old news which is relatively recent, and thus the time influence D3 does not reduce the perceived interest dramatically. The perceived interest of the item in the second row is 7. In the third row of Example 1, another 'news' item is listed, but is 5 days old and may be considered out of date. As a result of the news item being out of date, the perceived interest rating is only 2, due at least in part to the time influence D3. Finally, the fourth row of Example 1 is for an item having the category 'recipe', and relates to a pasta recipe. In one embodiment, the user has a personal preference profile which indicates the user's liking for Italian food (such as pasta). The algorithm may take into account a match between the user's preference for Italian food and the type of food to which the recipe relates (pasta) in determining the component D1. As a result, the likeability score, or perceived interest, for the item in the fourth row is 8. Each of the items in the table may be compared with a threshold value to determine whether the item should be downloaded. If, for example, the threshold value is 6, then the first, second and fourth items would be downloaded, but the third item would not be downloaded.

In Example 2 in FIG. 2, example likability scores for an app (executable file, or application) are shown. The "Key" column of Example 2 indicates the category and name of the item (key), the "Val" column of Example 2 indicates the item's perceived interest value on a scale from 0 to 10. The "Remarks" column of Example 2 provides commentary. The first row of Example 2 is for an item having a category 'utility', and has a perceived interest of 9 which is a high value likely to be downloaded automatically to the user device 20. The item is a taxi app, and the user of the user device 20 is a frequent traveller (this could be indicated in the preference information). As a result, the personal preferences component D1 is likely to have a high value. The second row of Example 2 is for an item having the category 'game', and is in particular a kids painting game. The personal preferences component D1 may take into account not only the preferences of the main user of the user device 20, but potentially also other users, for example other family members. In one embodiment, a kids painting game provides a good match to the family preference information, resulting in a high D1 component. In the third row of Example 2, another 'game' item is listed, but the other game is a version of a game already present on the user device 20, and the new version is perceived to be buggy (this might be assessed based on the item's social popularity, with user reviews indicating problems with the game) which results in a low perceived value score of 3. Because this item is a version of an already stored game, a decision as to whether to replace the already stored game may be made by comparing the perceived interest of the new version with the perceived interest of the existing stored version, which may be instead of or in addition to the usual comparison of the perceived interest value with a threshold. Finally, the fourth row of Example 2 is for an item having the 'utility' category, and relates to a stock ticker. The user's personal preference indicates avoidance of finance related apps, and thus the component D1 is set very low and the overall perceived interest is 2. Each of the items in the table of Example 2 may be compared with a threshold value to determine whether the item should be downloaded. If, for the example, the threshold value is 6, then the first and second items would be downloaded, but the third and fourth items would not be downloaded.

Figure 3:
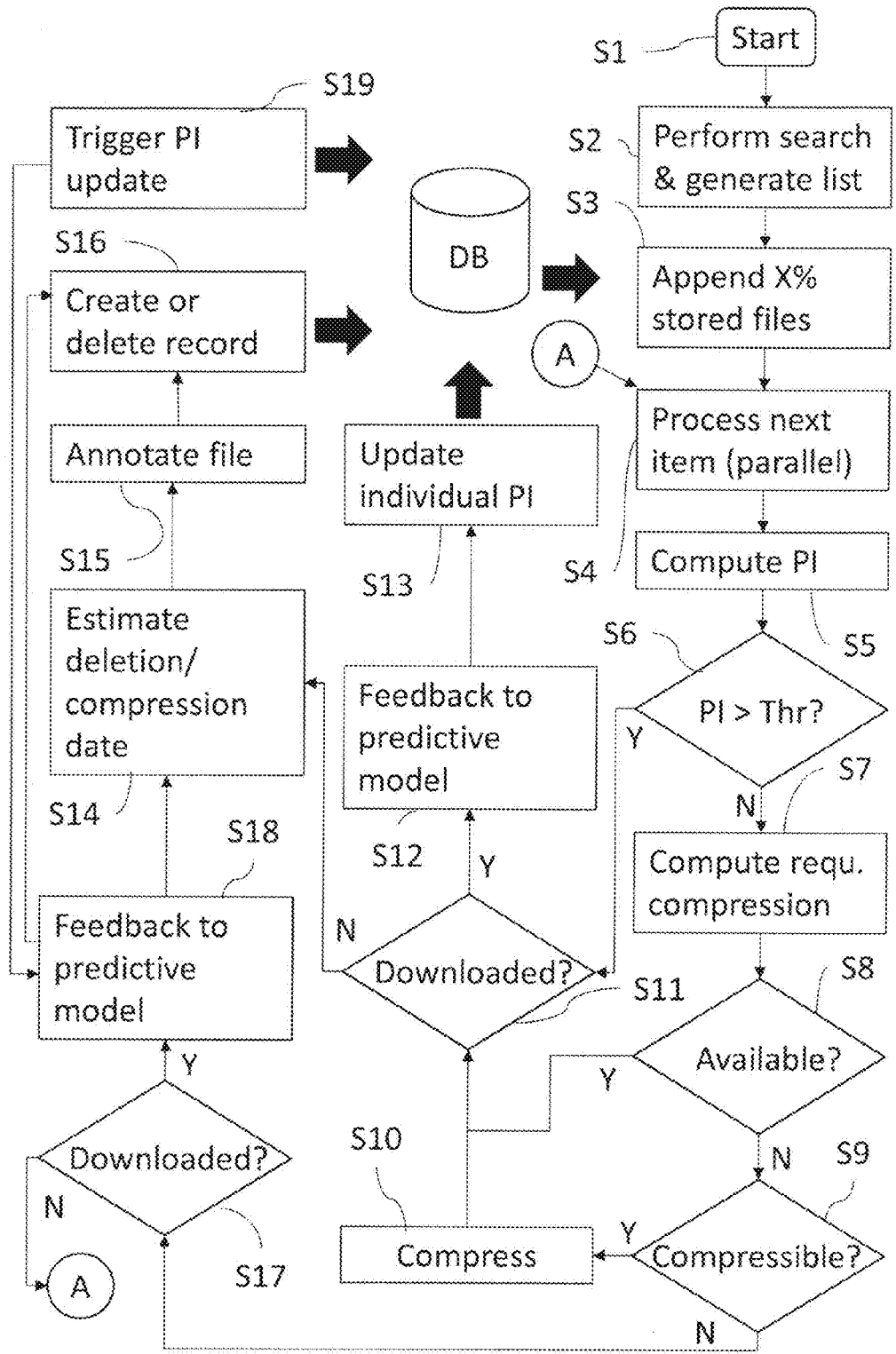
FIG. 3 is a schematic flow diagram of a method of managing a device memory, in accordance with embodiments of the present invention.

FIG. 3 is a schematic flow diagram of a method of managing a device memory, in accordance with embodiments of the present invention. In FIG. 3, a flow diagram demonstrates some aspects of the overall process flow. At step S1, the process starts. At step S2, a search for downloadable items is conducted and a list of external candidate files or applications available to the user is formed. This could be achieved by interfacing with apps on the user device 20 (such as news apps, social media apps, email apps and so on). At step S3, a database of already downloaded files and/or apps is referred to, and a bottom X % of these files and/or apps (X either being a fixed value or a user input) by perceived interest are appended to the list generated at step S2. At step S4, a file or app from the list starts to be processed. It will be appreciated that parallel processing of files is possible, and likely, but in the interests of clarity, the steps here are shown linearly in one embodiment. At step S5, the perceived interest index (PI) for the current file is computed as discussed above in relation to FIG. 2. It is then determined at step S6 whether the computed perceived interest is above a threshold value. If the computed perceived interest is not above a threshold value, then at step S7 it is determined at what compression level the perceived interest would increase to above the threshold value. It is then determined at step S8 whether the current file is already available at that compression level. If the current file is not already available at that compression level, then it is determined at step S9 whether or not the file can be compressed. If the file can be compressed then at step S10, the file is compressed (at the server 10 where the file is currently present) prior to being transferred to the user device 20. At step S11, it is determined if the file has already been downloaded to the user device 20. If so, then feedback is provided to the predictive model at step S12 to determine if a scheduled deletion or compression date for the item needs to be updated (for example, because the perceived interest for that item has increased which might delay or even completely cancel a scheduled deletion or archiving of the item, or decreased which might bring forward a scheduled deletion or archiving of the item, or even cause the item to be deleted or archived immediately). Then, at step S13, the computed perceived interest of the file is updated in the database. It will be appreciated that steps S12 and S13 are specific to when an already stored item is being handled. Otherwise the item is downloaded as part of step S11, and at step S14 a predictive model is used to estimate a deletion or compression date for the newly downloaded item. The deletion or compression date could be based for example on the current perceived interest for the item, and the rate at which the current perceived interest for the item is likely to decay over time (based on the time influence factor D3). At step S15, the file is annotated with fields, including a perceived interest and predicted time stamps for compression and deletion of the file. A new record in the database is then created at step S16. At step S17, following a determination at step S9 that the item cannot be sufficiently compressed to justify being downloaded, it is determined if the item has already been downloaded. If the item has not already been downloaded, then the process returns to step S4 where the next file or app is considered. If the item has already been downloaded, then at step S18 feedback is provided to the model to determine if a scheduled deletion or compression data for the item needs to be updated (for example because the perceived interest for that item has increased which might delay or even complete cancel a scheduled deletion or archiving of the item, or decreased which might bring forward a scheduled deletion or archiving of the item, or even cause the item to be deleted or archived immediately). If the item has been deleted, then at step S16 the corresponding record in the database will be deleted as well. At step S19 (carried out every N hours, where N is any positive number), a job scheduling function/universal perceived interest updating function is carried out, feeding back into the predictive model to cause the perceived interest for all currently stored items to be recalculated (and the database updated accordingly), with files and records being archived or deleted (if no longer sufficiently interesting) or their deletion schedules modified. Factors which may be taken into account in this process may include: which files or apps have been recently accessed or forwarded to others by the user, changes to the user's personal preferences, and changes in the availability of data transmission bandwidth or device storage space (for example, the user may have manually deleted items from the device, freeing up storage space). In particular, a decision to archive or delete a stored item may be made if the perceived interest for that item is less than a predetermined value.

One of the processes present in FIG. 3 is the selection or generation of low resolution or compressed formatted media for download if the full resolution, uncompressed version would not have a sufficiently high perceived interest due to factors D4 (data consumption of download bandwidth) and/or D5 (available storage on device). This low resolution or compressed formatted media is primarily intended for images, audio and videos. In particular, the perceived interest level/score is recomputed with a low resolution media file size or with a compressed file format (which improves its perceived interest due to the reduced data impact). If the recomputed perceived interest level/score passes a download criteria, on the server 10 side, the media is resized/converted to fit the requirement and then downloaded to the user's device 20 or cloud storage.

In one example, a WAV audio format could be optionally converted to MP3 format before download. In another example, a 1600×900 pixel image file can be converted to 800×600 pixel resolution before download. In another example, a video file is available for download with a file size of 10 MB in AVI format. [A1] In one embodiment, the user device 20 determines the effective score/index from the level of likely user interest, current data consumption, and predicted data consumption based on historic data usage patterns. In another embodiment, the server 10 determines the effective score/index after which the user system 20 obtains the effective score/index from the server 10. This total score is just below a preset threshold, which results in a decision not to download the file. The user device 20 or server 10 now determines that if the file size was to be less than or equal to 7 MB, the [A2] user device 20 or server 10 would have downloaded the file. A tool sitting on the server 10 then compresses/converts the file to MP4 format and/or converts the video to a low resolution video. Such a converted media is then downloaded.

Figure 4:
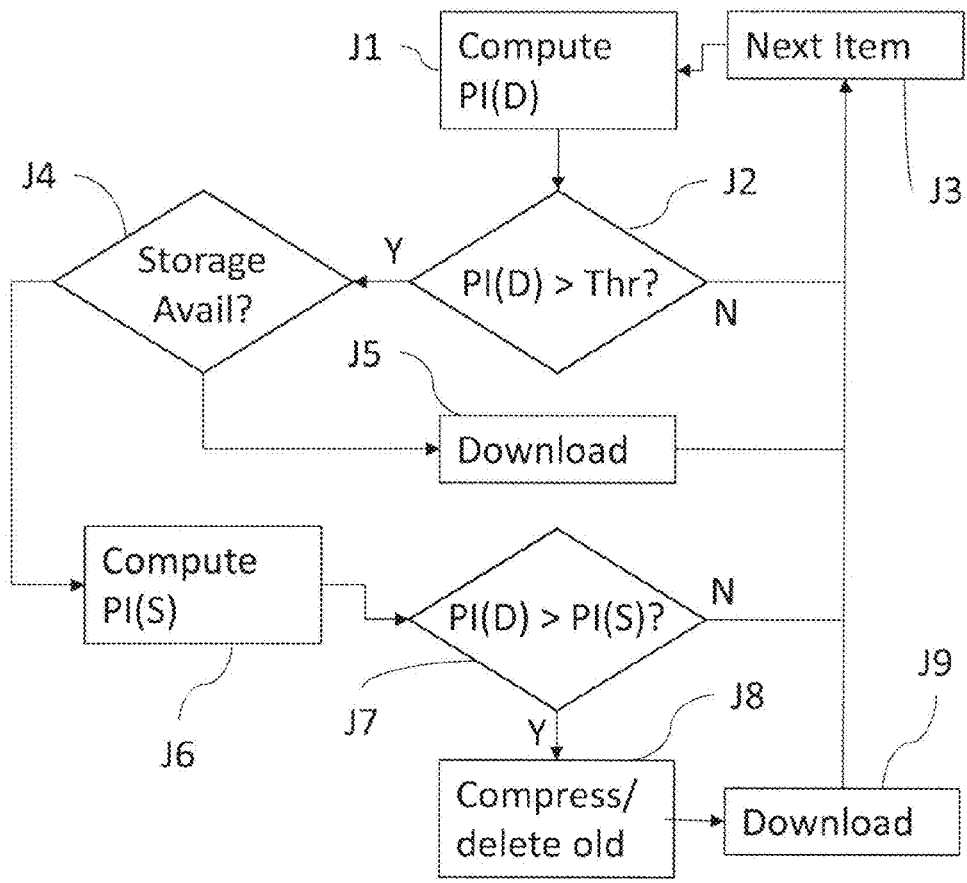
FIG. 4 is a schematic flow diagram of a method of handling a download when insufficient space is available for storing a new item, in accordance with embodiments of the present invention.

FIG. 4 is a schematic flow diagram of a method of handling a download when insufficient space is available for storing a new item, in accordance with embodiments of the present invention. In FIG. 4, a flow diagram shows how the present technique can be used when there is little free storage available on the user device. Generally, FIG. 4 illustrates that, if it is determined that the user's device 20 has insufficient storage for an otherwise interesting download, the same selection criteria applied to downloadable items could also be applied to material already on the user device 20, with a view to compressing or archiving less valuable material to make space for the new download. In particular, the perceived interest of the incoming media can be compared against the most recent perceived interest (computed by taking into account time sensitivity) of the media already present on the user device 20. If the incoming media has a higher perceived interest, the incoming media could be downloaded after one or more media files already present on the user device has been compressed or deleted. This downloading process may run as follows. At step J1, a perceived interest rating is calculated for a downloadable item at a remote server. At step J2, this perceived interest is compared with a threshold. If the perceived interest is determined to be at or below the threshold, then the downloadable item is not downloaded and at step J3, the next downloadable item is selected. If at step J2, it is determined that the perceived interest of the downloadable item is above the threshold, then it is determined at step J4 whether there is adequate storage to download the item. If so, then at step J5, the item is downloaded. If not, then at step J6, the perceived interest rating of one or more already stored files is computed. It will be appreciated that this may have been done in advance with the results stored in the database as described with reference to FIG. 3 above, in which case step J6 would simply involve checking for the files having the lowest perceived interest rating. At step J7, it is determined whether the perceived interest rating of the downloadable item is higher than the perceived interest of one or more of the already stored items. If not, then the process returns to step J3. If so, then at step J8, the stored items are compressed or deleted to free up space on the user device, and at step J9, the downloadable item is downloaded. The process then returns to step J3 to consider the next candidate downloadable item. From FIG. 3 it will be appreciated that stored items are eventually deleted or compressed anyway, but the technique shown in FIG. 4 enables deletion or compression of items not yet scheduled for deletion or compression in the event that a more interesting downloadable item becomes available.

Figure 5:
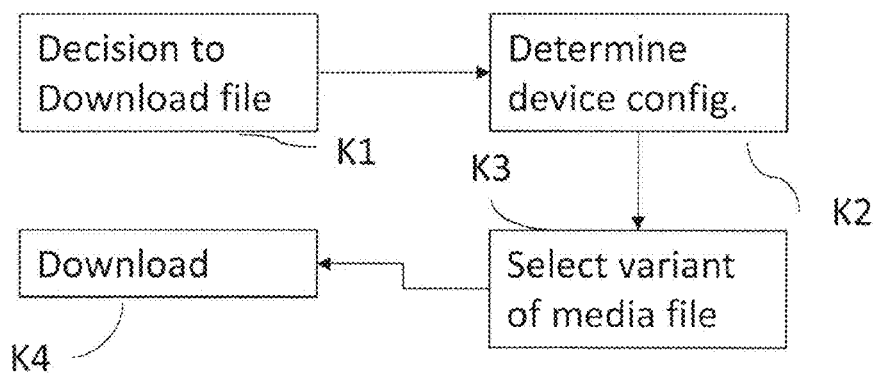
FIG. 5 is a schematic flow diagram of a method of handling a download having regard to the configuration and current state of a user device, in accordance with embodiments of the present invention.

FIG. 5 is a schematic flow diagram of a method of handling a download having regard to the configuration and current state of a user device, in accordance with embodiments of the present invention. In FIG. 5, an option to select downloadable items in dependence on the configuration of the user device and/or its current state is shown. Generally, in response to deciding to download the file, the user device 20 or server 10 may take into consideration the specifics of the user's device 20, such as screen resolution and percentage of free memory, and download the media file with an appropriate resolution whenever possible. In particular, in response to a decision to download a media file having been made at step K1, the device configuration and its current state are determined at step K2. The device configuration may for example include the screen resolution and/or dimensions. The current state may for example include the amount of memory currently free. Based on the determined device configuration and current state, an appropriate variant of the media file is selected at step K3. The appropriate variant of an image file for example may be one having a resolution appropriate to the screen resolution, and/or a data size appropriate for the amount of free memory on the user device. At step K4, the selected variant of the media file is downloaded. If the required variant is not available, the required variant may be generated from a source file at the server on demand. It will be appreciated that the same principles could be extended to application files, since different variants of the same application may be appropriate for devices having different configurations.

Figure 6:
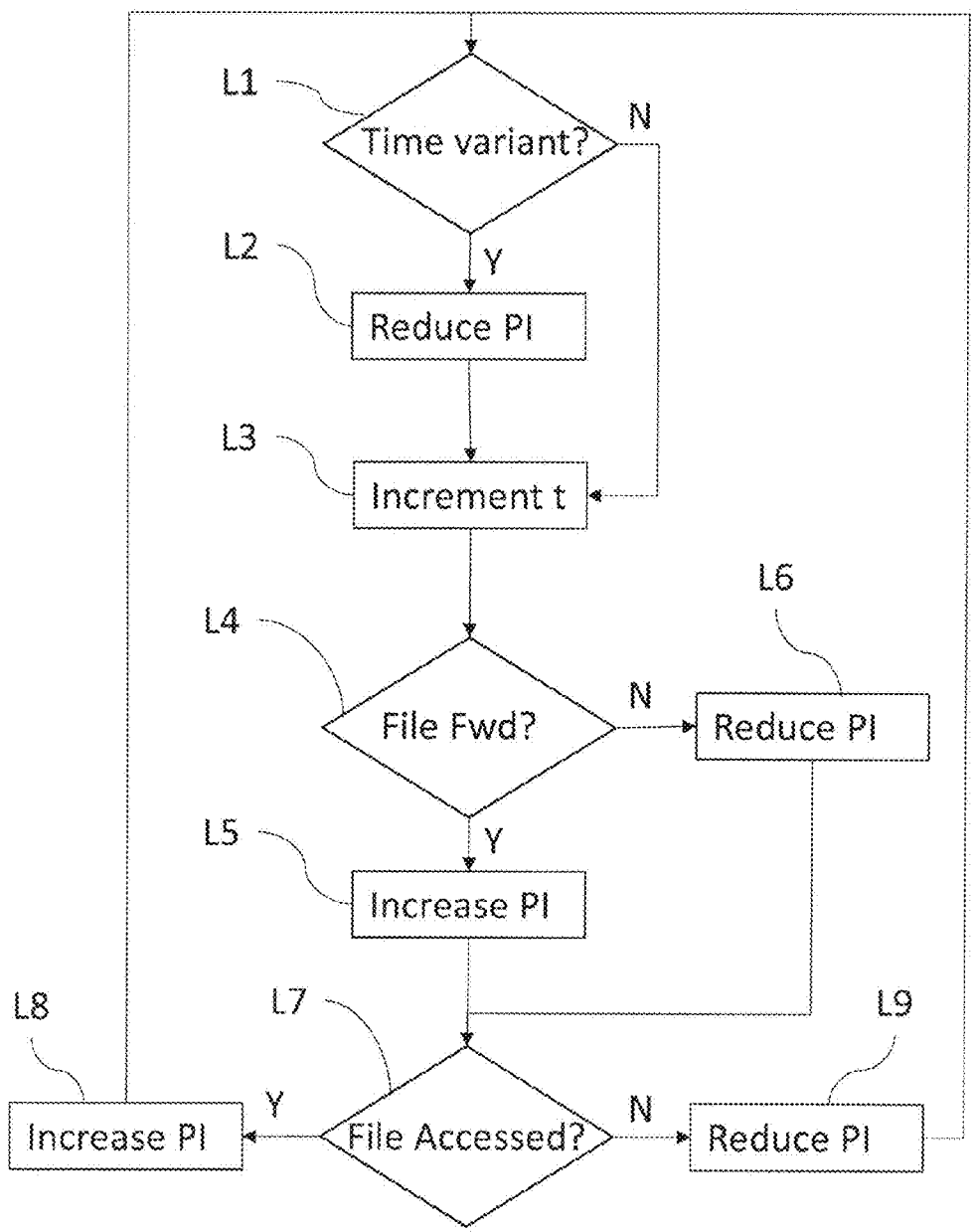
FIG. 6 is a schematic flow diagram of a method of varying perceived interest as a function of time and activity, in accordance with embodiments of the present invention.

FIG. 6 is a schematic flow diagram of a method of varying perceived interest as a function of time and activity, in accordance with embodiments of the present invention. In FIG. 6, a schematic flow diagram indicates how the perceived interest of a stored item or downloadable item can be time sensitive, or sensitive to user interactions over time. This process may be triggered by step S19 in FIG. 3, or may be ongoing. Generally, the time sensitivity could be factored by making the perceived interest depend on time. For an already downloaded file, the perceived interest in the already downloaded file may decrease with time. The time-dependent perceived interest could be determined from the passage of time, or from factors such as the number of forwards of that particular file by the user and number of file views by the user since download. The updated perceived interest level will usually be lower than the perceived interest level at the time of download. Certain files, such as recipes, might be viewed typically once a month but as long as the viewing frequency does not change over time, the perceived interest should remain substantially constant with time for such files. For new media/applications that are yet to be downloaded, time-dependent perceived interest could be set high for some communications such as news videos, which typically lose their perceived interest due to the nature of news items focusing on current events.

An example process for modifying the perceived interest based on time is as follows. At step L1, it is determined whether a particular item is a directly time variant type or not. If it is determined that the item is directly time variant, then the perceived interest is reduced at step L2 (by reducing the time influence component D3 in FIG. 2). It will however be appreciated that in an alternative embodiment, the perceived interest may instead be increased over time (one example being classic sporting moments), which could be achieved by increasing the time influence component. More generally perceived interest may be changed over time. Time is incremented at step L3. If at step L1, it is determined that the item is not directly time variant, then step L2 is omitted. In either case, at step L4, it is determined whether the item has been forwarded to or shared with another user. If so, then the perceived interest for the item is increased at step L5; otherwise it is decreased at step L6. It is then determined, at step L7, whether the item has been accessed by the user (for example if the item is a document that has been opened, or if the item is an application that has been run). If the item has been accessed by the user, then at step L8, the perceived interest for the item is increased, whereas if the item has not been accessed by the user, the perceived interest is decreased at step L9. In this way, the passage of time itself (steps L2 and L3) or the occurrence of events over time (steps L4 to L9) can influence the perceived interest of items. Generally this process is of most relevance to already stored items, allowing replacement of the items as the items become redundant, but time variance can also be relevant (as discussed above) for downloadable items, since the downloadable items may become less interesting to download over time. It will be appreciated that, in another embodiment, steps L5 and L9 could be omitted, such that the perceived interest can only be reduced over time, not increased.

Figure 7:
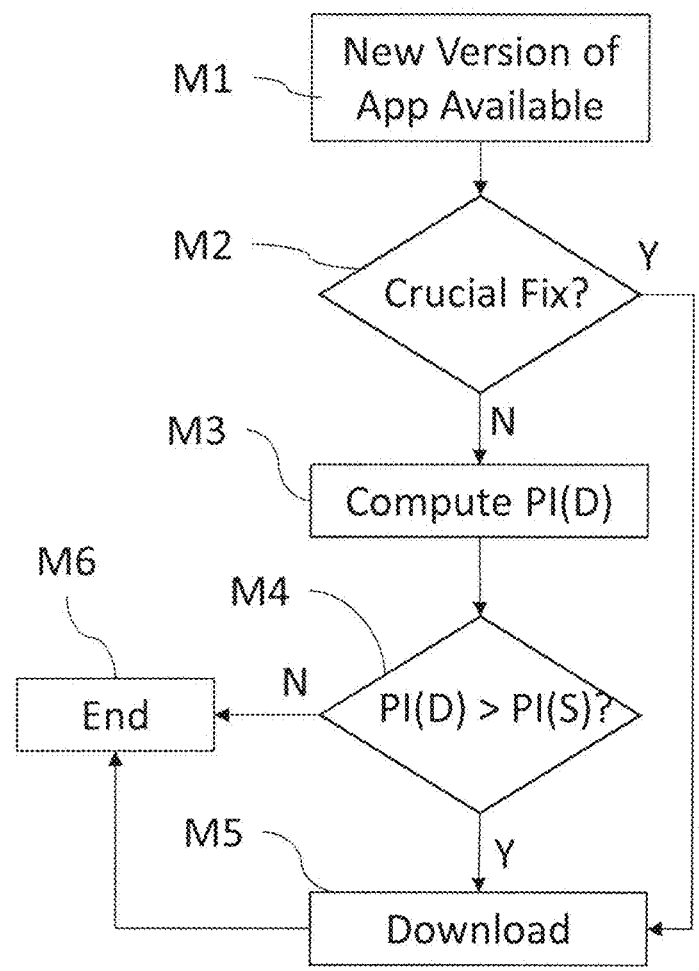
FIG. 7 is a schematic flow diagram of a method of updating software on a user device, in accordance with embodiments of the present invention

FIG. 7 is a schematic flow diagram of a method of updating software on a user device, in accordance with embodiments of the present invention. In FIG. 7, the use of the present technique for the updating of software applications is demonstrated. At step M1, a new version of an application for which a previous version is already stored and installed on the user device 20 becomes available and is detected (for example by way of the search step S2 in FIG. 3). It is determined at step M2 whether the new version includes a crucial security fix, and if so, at step M5, the new version is downloaded and replaces the old version. It will be appreciated that security issues may outweigh likeability issues. If available storage space on the device is too low, then it may be necessary also to identify the stored item or items having the lowest perceived interest and deleting the stored item or items having the lowest perceived interest to free up sufficient space to perform step M5. If at step M2, it is determined that the new version does not contain a crucial security fix, then at step M3, a perceived interest is calculated for the new version. The perceived interest for the new version is then compared with the perceived interest of the old version at step M4. If the new version has a higher perceived interest than the old version, then the new version will be downloaded and used to upgrade or replace the old version at step M5. If it is determined at step M4 that the old version has a higher perceived interest, then the new version will not be downloaded, and the process will end at step M6. It will be appreciated that new versions of software are sometimes buggy (i.e., have errors) when released, or include changes which are generally unpopular with users. This process will effectively inhibit buggy or substandard programs from automatically replacing older but more stable versions. It will be appreciated that, referring to FIG. 2, the new application might score well on D3 (time, since it is the more up to date version), but may score poorly on D2 if the new application is known to include bugs. If the new software is much larger than the old version then a decision may be made not to replace the old version with the new version, due to the influence of the data impact on the overall perceived interest.

Three examples of this are provided for the purposes of illustration. Example 1: If the new version of an already downloaded app is buggy, the perceived interest of the new version may end up being lower than the existing version. In such cases, the [A3] user device 20 or server 10 can decide to keep the old version. Example 2: The new version fixes a crucial security bug which reduces perceived interest. The security should override the likability. In such cases, the existing application can even end up being deleted. Example 3: The perceived interest of an existing app is diminishing over time. A new version promises exciting new features which improves the perceived interest of that app in comparison with the existing version. The decision is made to upgrade the existing version.

It will be appreciated that the techniques described above may make it possible to achieve detailed management of the acquisition of new content (which might be media content or application data) and the retention, archiving or deletion of existing content. In the latter case, consideration may be had of the ongoing interest of stored material to the user—noting that certain types of files may become less relevant once the files have been accessed once, otherwise the files may gradually reduce in relevance over time, while other files may remain relevant irrespective of the passage of time. More generally, the present techniques may make appropriate use of available bandwidth and storage capacity, while providing a user with access to the files the user may require when the user requires the files.

The above techniques may determine the perceived interest level of files or applications available for a user to download. Such applications or files may be presented to the user via social media, forwarded electronic messages, a mobile web browser, or any other mechanism. This perceived interest level or index is a function of various factors such as personal preferences, social popularity, data consumption, available device memory and time influence.

The [A4] user device 20 or server 10 may implement a predictive model to estimate the deletion/compression date of the media/app. Predictive insight may be obtained based on the key inputs from parameters such as a historic usage pattern for files of similar category. This information can be used for first level filtering of probable candidates for deletion/compression. This feature can also be used if an option such as 'Quick Scan' is offered by such service.

Figure 8:
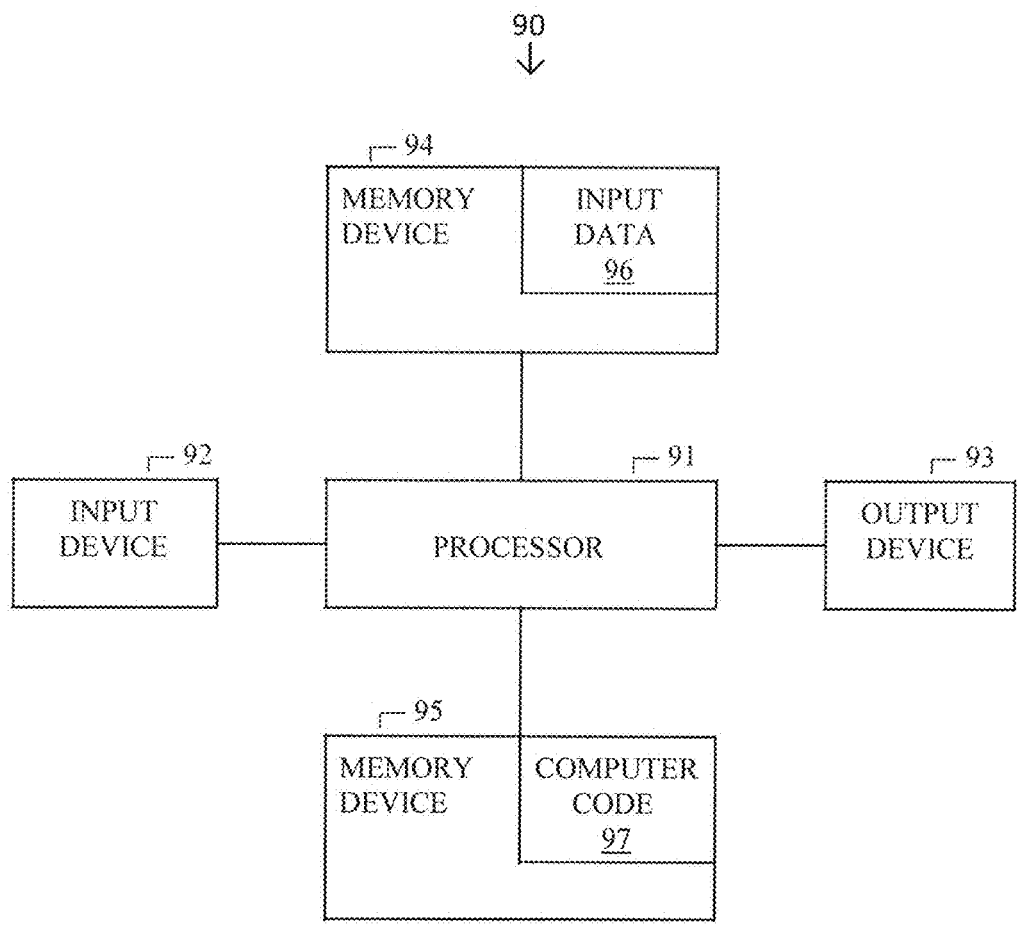
FIG. 8 illustrates a computer system used for implementing the methods of the present invention.

FIG. 8 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may include the computer usable storage medium (or the program storage device).

Thus a process for supporting, deploying and/or integrating computer infrastructure, integrating, hosting, maintaining, and deploying computer-readable code into the computer system 90 is disclosed, wherein the code in combination with the computer system 90 is capable of implementing the methods of the present invention.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structure in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may computer copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FGPA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture instructing instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart of block diagrams may represent a module, segment, or portion of instruction, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:
computing, by one or more processors of a computer system, a user interest rating for a downloadable item stored outside a user device of a user, wherein the user device comprises a total amount of currently available unused data storage space, wherein said computing the user interest rating for the downloadable item is based on one or more identified characteristics of the downloadable item and a user profile of the user, and wherein the user profile of the user is indicative of a preference of the user for first types of items that include the downloadable item;
computing, by the one or more processors, a data impact rating for the downloadable item, wherein said computing the data impact rating is based on a proportion of the total amount of currently available unused data storage space that would be consumed in downloading the downloadable item to the user device, and wherein the data impact rating's dependence on the proportion is that the data impact rating increases as the proportion decreases and vice versa; and
making, by the one or more processors, a download decision, as to whether to download the downloadable item, in dependence on the computed user interest rating for the downloadable item and the computed data impact rating for the downloadable item.

2. The method of claim 1, wherein said making the download decision comprises deciding whether to download the downloadable item to one or both of local storage on the user device or a cloud storage area associated with the user device and/or the user of the user device.

3. The method of claim 1, wherein said making the download decision comprises selecting between multiple versions of the downloadable item.

4. The method of claim 1, wherein said computing the user interest rating for the downloadable item comprises performing one or more steps selected from the group consisting of: identifying feedback on the downloadable item provided by other users, identifying the user's preference for items received from a sender of the downloadable item, utilizing a preference correlation between the user and other users who have downloaded the downloadable item, and combinations thereof.

5. The method of claim 1, said method comprising:
combining, by the one or more processors, the user interest rating for the downloadable item and the data impact rating for the downloadable item to form a combined rating for the downloadable item, wherein said making the download decision comprises determining whether the combined rating for the downloadable item satisfies a condition.

6. The method of claim 5, wherein the downloadable item is a media item, and wherein said making the download decision comprises:

deciding not to download a high resolution and/or uncompressed version of the media item, said deciding not to download based on the combined rating for the downloadable item;
computing a combined rating for a lower resolution and/or compressed version of the media item; and
in response to a determination that the combined rating for the lower resolution and/or compressed version of the media item satisfies the condition, then downloading the lower resolution and/or compressed version of the media item.

7. The method of claim 5, wherein the downloadable item is a media item, and wherein said making the download decision comprises:
deciding not to download a high resolution and/or uncompressed version of the media item, based on the combined rating for the downloadable item not satisfying the condition;
computing a reduced resolution and/or compression level in response to a determination that the media item has a combined rating which satisfies the condition;
resizing or converting the media item to the computed reduced resolution and/or compression level; and
downloading the resized or converted media item to the user device.

8. The method of claim 1, wherein the downloadable item is a media item, and wherein said making the download decision comprises selecting a version of the media item to download in dependence on one or more characteristics of the user device.

9. The method of claim 8, wherein the one or more characteristics of the user device comprise a screen resolution for the user device.

10. The method of claim 1, said method further comprising:
computing, by the one or more processors, a user interest rating for a stored item stored at the user device, wherein said computing the user interest rating for the stored item comprises maintaining the user profile to be indicative of the preference of the user for second types of items that include the stored item, identifying one or more characteristics of the stored item, and predicting a likely level of user interest of the user for the stored item based on the identified one or more characteristics of the stored item and the user profile;
computing, by the one or more processors, a data impact rating for the stored item, wherein said computing the data impact rating for the stored item comprises identifying one or more quantities selected from the group consisting of: a file size of the stored item, the amount of free storage space on the user device, and a combination thereof; and
making, by the one or more processors, an archive or deletion decision, as to whether to archive or delete the stored item, in dependence on the computed user interest rating for the stored item and the computed data impact rating for the stored item.

11. The method of claim 10, said method comprising:
combining, by the one or more processors, the user interest rating for the stored item and the data impact rating for the stored item to form a combined rating for the stored item, and wherein said making the archive or deletion decision comprises determining whether the combined rating for the stored item satisfies a condition.

12. The method of claim 11, wherein the combined rating for a stored item varies in dependence on at least one number of times selected from the group consisting of: one or more of a number of times the stored item has been sent by the user to another user, a number of times the stored item has been accessed by the user, and a combination thereof.

13. The method of claim 11, further comprising in response to a determination that the combined rating for the downloadable item is higher than the combined rating for the stored item, archiving or deleting the stored item and downloading the downloadable item.

14. The method of claim 10, wherein the downloadable item is an updated version of the stored item, and wherein the method further comprises in response to a determination that the combined rating for the downloadable item is higher than the combined rating for the stored item, downloading the downloadable item to replace the stored item.

15. The method of claim 14, wherein the method further comprises in response to a determination that the updated version of the stored item addresses a security issue with the stored item, downloading the updated version of the stored item and/or deleting the updated version of the stored item.

16. The method of claim 11, said method comprising:
scheduling, by the one or more processors, the stored item for compression or deletion in dependence on the combined rating for the stored item.

17. A computer program product, comprising one or more computer readable hardware storage devices having computer readable program code stored therein, said program code containing instructions executable by one or more processors of a computer system to implement a method, said method comprising:
computing, by the one or more processors, a user interest rating for a downloadable item stored outside a user device of a user, wherein the user device comprises a total amount of currently available unused data storage space, wherein said computing the user interest rating for the downloadable item is based on one or more identified characteristics of the downloadable item and a user profile of the user, and wherein the user profile of the user is indicative of a preference of the user for first types of items that include the downloadable item;
computing, by the one or more processors, a data impact rating for the downloadable item, wherein said computing the data impact rating is based on a proportion of the total amount of currently available unused data storage space that would be consumed in downloading the downloadable item to the user device, and wherein the data impact rating's dependence on the proportion is that the data impact rating increases as the proportion decreases and vice versa; and
making, by the one or more processors, a download decision, as to whether to download the downloadable item, in dependence on the computed user interest rating for the downloadable item and the computed data impact rating for the downloadable item.

18. The computer program product of claim 17, said method comprising:
combining, by the one or more processors, the user interest rating for the downloadable item and the data impact rating for the downloadable item to form a combined rating for the downloadable item, wherein said making the download decision comprises determining whether the combined rating for the downloadable item satisfies a condition.

19. A computer system, comprising one or more processors, one or more memories, and one or more computer readable hardware storage devices, said one or more hardware storage device containing program code executable by the one or more processors via the one or more memories to implement a method, said method comprising:

computing, by the one or more processors, a user interest rating for a downloadable item stored outside a user device of a user, wherein the user device comprises a total amount of currently available unused data storage space, wherein said computing the user interest rating for the downloadable item is based on one or more identified characteristics of the downloadable item and a user profile of the user, and wherein the user profile of the user is indicative of a preference of the user for first types of items that include the downloadable item;

computing, by the one or more processors, a data impact rating for the downloadable item, wherein said computing the data impact rating is based on a proportion of the total amount of currently available unused data storage space that would be consumed in downloading the downloadable item to the user device, and wherein the data impact rating's dependence on the proportion is that the data impact rating increases as the proportion decreases and vice versa; and making, by the one or more processors, a download decision, as to whether to download the downloadable item, in dependence on the computed user interest rating for the downloadable item and the computed data impact rating for the downloadable item.

20. The computer system of claim 19, wherein the one or more parameters are selected from the group consisting of: a file size of the downloadable item, an amount of free storage space on the user device, a data transfer quota remaining for the user device, and combinations thereof.

* * * * *